May 13, 1969 D. HARTLEY ET AL 3,444,527

INDIRECT ADDRESSING USING A PRE-PROGRAMMED MICRO-PROGRAMME STORE

Filed Nov. 9, 1966 Sheet 1 of 2

INVENTORS

DAVID HARTLEY
BRIAN HERBERT SWANICK
ORRAN TERENCE PATE

BY Young + Thompson
ATTYS.

INVENTORS
DAVID HARTLEY
BRIAN HERBERT SWANICK
ORRAN TERENCE PATE
BY Young & Thompson
ATTYS.

United States Patent Office 3,444,527

Patented May 13, 1969

3,444,527

INDIRECT ADDRESSING USING A PRE-PROGRAMMED MICRO-PROGRAMME STORE

David Hartley, Brian Herbert Swanick, and Orran Terence Pate, Liverpool, England, assignors to Automatic Telephone & Electric Company Limited, Liverpool, England, a British company Filed Nov. 9, 1966, Ser. No. 593,075

Claims priority, application Great Britain, Nov. 11, 1965, 48,008/65

Int. Cl. G11b *13/00*

U.S. Cl. 340—172.5 4 Claims

ABSTRACT OF THE DISCLOSURE

Indirect addressing techniques are applied to a data processing arrangement employing a pre-programmed micro-programme store. An order word, including an instruction code and at least one address code, in an order register also includes a marking if indirect addressing applies, a logic circuit responding to the marking to cause the instruction code to be transferred from the order register to a subsidiary register and to cause the insertion into the order register of a locally generated instruction code relative to indirect address operation. The inserted instruction code enables the micro-programme store to define a micro-programme which enables the main store to be addressed with address code in the order register and a further address code to be extracted from the main store to replace the address code in the order register. Said further address code is tested for an indirect address marking which, if present, causes the indirect address operation to be repeated and, if absent, replaces the inserted instruction code in the order register by the original instruction code whereby the data processing arrangement re-enters the main programme order.

Figure 1:
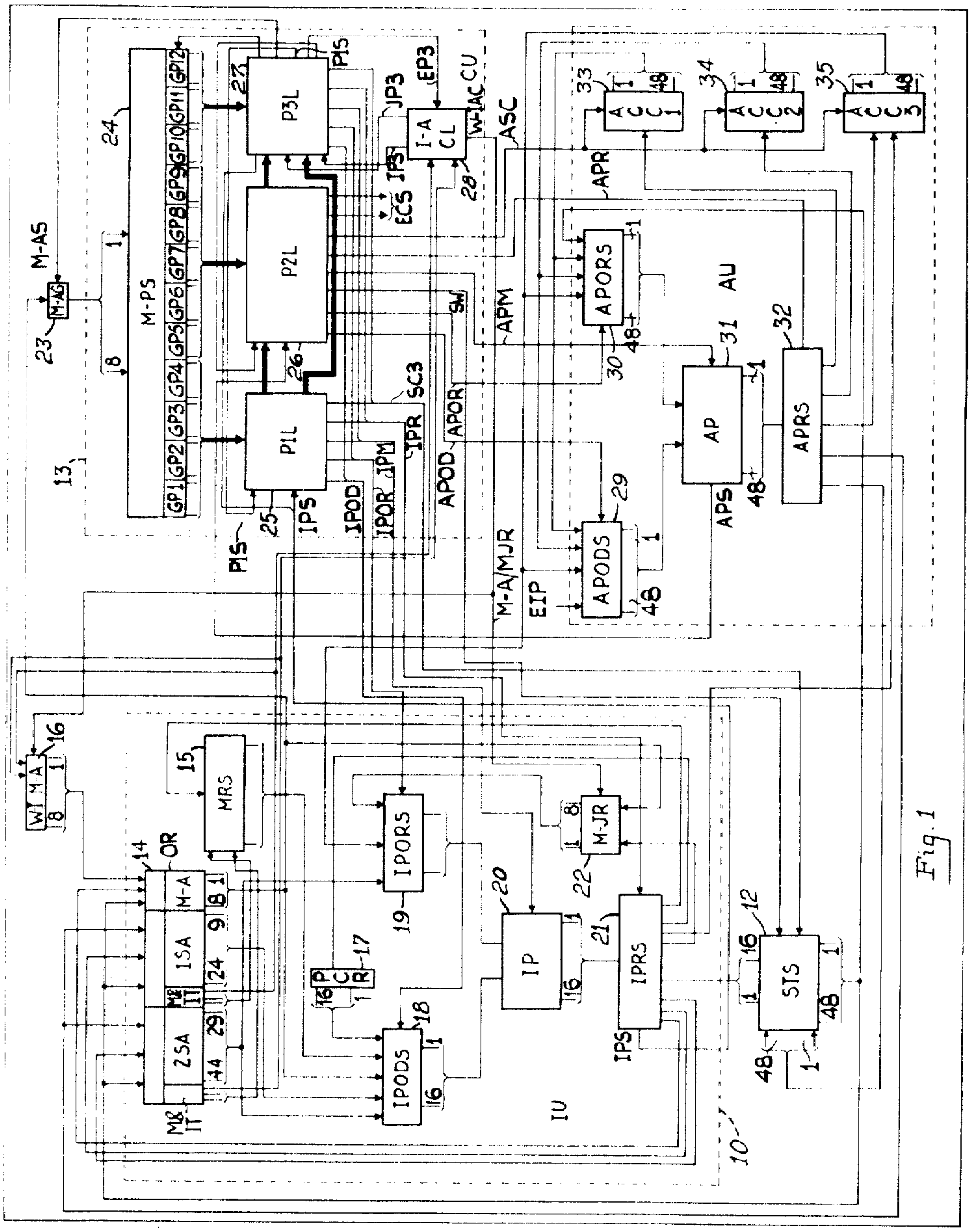

The present invention relates to data processing systems and is more particularly concerned with such a system which employs the so-called indirect addressing operation.

In a data processing system, information for use in the programme is stored in a memory device. When access to any particular item of information is required by a programme the memory location storing that item of information is addressed and the required information is read-out of the memory. The information read out is then passed from the memory to a utilisation section of the data processing system in accordance with the programme step requirements.

The operations and memory location addresses for any one programme step are specified in an order word written for each programme step by the programmer. In certain cases the programmer may not know, at the time of writing the programme, where a particular item of information is to be found in the memory. Typically this situation may arise in a "real-time" data processing system where information items, generated by equipment external to the data processing device, are passed to the data processing device and stored in any free memory location. In this case the programme which controls the handling of the generated item of information is arranged to write into a particular address location in the memory the address of the memory location into which the generated item of information has been written. When access to the generated item of information is required, the programmer specifies in the order word the memory address of the location into which the address of the memory location used to store the generated item of information has been written. Hence the data processing device is required to change the original address in the order word to the address stored in the address specified by the order word. This operation is known as indirect addressing and may be used in other circumstances than that specified.

The use of indirect addressing operations avoids the problems and dangers of directly amending programme orders within the data processing system.

When an indirect addressing operation is required it is usual to provide a "tag" indication associated with the address in the order word. The sensing of the "indirect addressing tag" causes the inhibition of the current programme order and the replacing of the address in the order word with the contents of the memory location specified by that indirect address. This operation in prior art data processing devices has been performed logically. In other words indirect addressing control equipment is provided (a) to sense the "indirect addressing tag," (b) to inhibit the current order specified instruction until the indirect addressing operation is complete, (c) to address the store with the order word address, (d) to overwrite the data read out from the store into the order register at the section in which the indirect address was written and (e) to remove the inhibit on the instruction allowing the order to proceed.

The above operations require a relatively large amount of electronic equipment for the logical operations required and it is therefore the object of the present invention to provide an "indirect addressing arrangement" for use in a data processing device which substantially reduces the amount of logically orientated electronic equipment required.

According to the invention, in a stored programme data processing device including a control unit, a main store, an order register for storing an order word appropriate to a main programme order, said order word being formed of an instruction-defining code and at least one address code, a first functional unit controlled by said control unit to address said main store, a second functional unit controlled by said control unit to perform arithmetic operations, a pre-programmed micro-programme store for generating control signals for the instruction specified and addressed at the start of any main programme order by the code contained in the order register which defines the instruction, said instruction code forming the first of a series of sequential codes which define a micro-programme of micro-orders to be used to extract control information for the micro-programme store for use in said main control unit for the control of the data processing device in the execution of said instruction, an indirect address operation is initiated under the control of marking in a particular element of the order register directly associated with said address code and means are provided for detecting said marking and for transferring the instruction code from the order register to a subsidiary register and for replacing said instruction code by a particular instruction code relative to the indirect address operation and defining a micro-programme which enables the micro-programme store (a) to control the first functional unit to address the main store with the store address in the order register, (b) to control the second functional unit to replace the store address in the order register by the address read from the store location specified by that address and (c) to effect a test to determine whether the address read from said store location is an indirect address and if not to transfer the original instruction code from said subsidiary register back to the order register thereby re-entering the main programme order.

Figure 2:
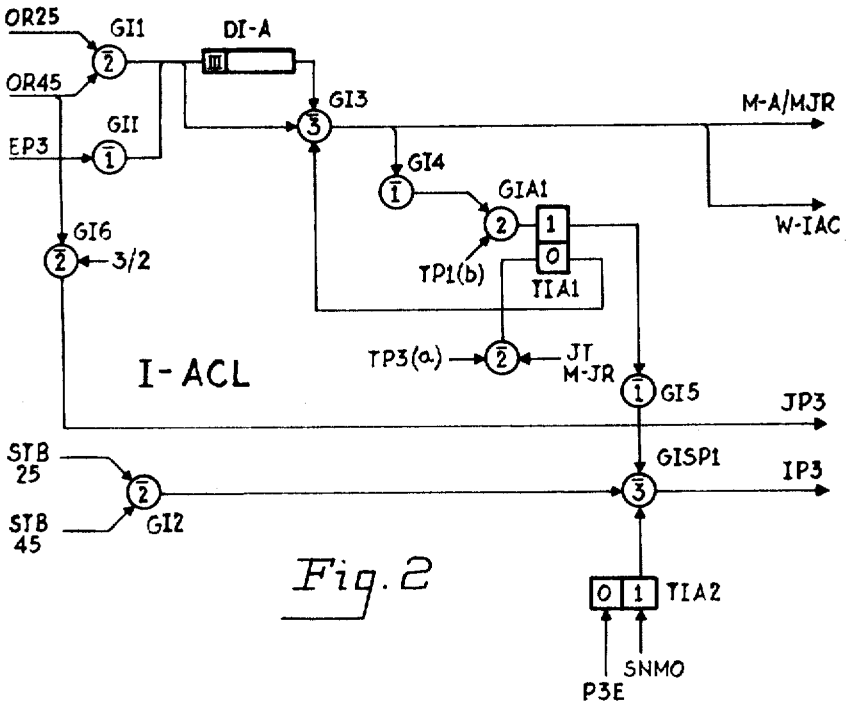
Figure 3:
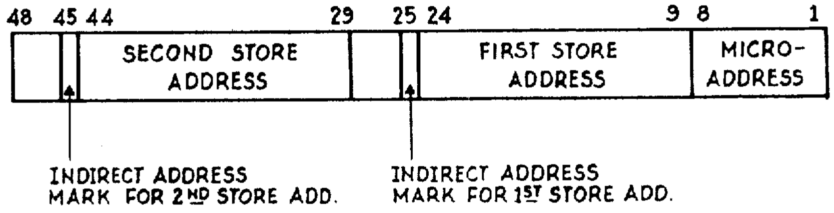

The invention will be better understood from the following description which should be read in conjunction with the accompanying drawings. Of the drawings, FIG. 1 shows a block diagram of a data processing device for use with the invention, FIG. 2 shows the logic required for one embodiment of the invention, while FIG. 3 shows the layout of an order word.

Referring firstly to FIG. 1, an outline description of a data processing device will be given which may advantageously employ the embodiment of the invention shown in FIG. 2. The data processing device may be divided into five sections as follows (i) the indexing unit 10, (ii) the arithmetic unit 11, (iii) the memory unit 12, (iv) the control unit 13, and (v) the peripheral equipment (not shown) and is of the general type disclosed in our co-pending application Ser. No. 505,638.

The indexing unit 10 consists of four registers or register blocks and an index processor. The four registers are (i) the order register 14, (ii) the modifier or index register block 15, (iii) the micro-jump register 22, and (iv) the programme sequence control register 17. The index processor 20 includes a pair of input switches, 18 for the operand input and 19 for the operator, and an output switch 21. The input switches 18 and 19 are used to connect various inputs to the index processor 20 while the output switch 21 is used to distribute the output of the index processor to any one of a number of required destinations. The operand input switch 18 allows the order register 14 access to the index processor together with the programme sequence control register 17 and the modifier or index register block 15. The operator switch 19 allows one section of the order register 14 and the micro-jump register 22, as well as the accumulator 35 in the arithmetic unit 11, access to the index processor. The index processor resultant switch 21 distributes the output of the index processor to all the registers in the index unit as well as allowing access to the memory unit 12 and accumulator 35 in the arithmetic unit. Certain sections of the order register are given access to the control unit CU and the modifier register block 15 and these sections will be discussed later.

The arithmetic unit 11 consists of three accumulator registers 33, 34 and 35 and an arithmetic processor 31. The accumulators are used to hold the operand and operator for most of the arithmetic operations and they have access to both the operand input, via input switch 29, and the operator input, via input switch 30, of the arithmetic processor 31. The input EIP to the operand input switch 29 for the arithmetic processor indicates any external input and may for example be from the peripheral equipment associated with the data processing device. The output from the memory is connected to the arithmetic processor via the operator input switch 30. The output from the arithmetic processor is distributed, by the output switch 32, to the three accumulators, the memory unit 12, the order register 14 in the index unit 10 and the peripheral equipment (not shown).

The memory unit 12 may consist of a number of stores and may conveniently be of the coincident current coordinate matrix type using magnetic cores. The memory unit is used to store the working data for the data processing device as well as the programme data and it is addressed by the output of the index processor 20 via the output switch 21. The working data is fed to, or accepted from, the arithmetic unit, while the programme data is fed to the order register 14 in the indexing unit 10.

The control unit 13 consists of a pre-programmed micro-programme store 24 which is used to generate twelve groups of control signals for the control of the operation of the data processing device. These control signals are divided into three sections, groups 1–4 forming the first section, groups 5 to 9 forming the second section, and groups 10 to 12 forming the third section. The first section contains control signals for the control of the indexing unit 10 and these signals are passed to that unit under the control unit logic 25. The second section contains control signals for the control of the arithmetic unit 11 and these signals are passed to that unit under the control of control unit logic 26. The third and final section contains test and control signals for the selection of the next step in the main or micro-programme and exercises control on the indexing unit. The three sections therefore organise three distinct phases in the function of the system of the data processing device, and these functions are known as phase 1, the indexing phase, phase 2, the arithmetic phase, and phase 3, the select next main or micro-order phase. The control unit 13 also includes a small block of logic 28 which is used to detect when an indirect-addressing operation is required.

Consideration will now be given to the operation of the data processing device for one main programme order. The main programme order word is read from the programme store section of the memory unit 12 at a location defined by the address in the sequence control register 17 and is passed into the order register OR in the indexing unit 10. The order word is a forty-eight bit word which is divided into three main sections as follows:

M–A (bits 1–8)—The micro-order address code (M-address) which defines the instruction (i.e. function) of the order and is used to address the micro-programme store 24 in the control unit 13.

1SA (bits 9–24)—The first store address which defines the memory unit location address at which the required data can be found.

(Bit 25)—The first store address indirect addressing tag, M&IT.

(Bits 26—28)—The first store address modifier tags which define one of the modifier or index registers within the modifier register block 15 whose contents are to be added to the first store address if modification is required.

2SA (bits 29–44)—The second store address which defines the memory unit location address at which the required data can be found. These bits may also be used to specify an iteration count when a complex arithmetic operation is required such as multiplication.

(Bit 45)—The second store address indirect-addressing tag, M&IT.

(Bits 46–48)—The second store address modifier tags which are used in a similar manner for the second store address at bits 26–28.

When the order word has been read into the order register 14, the M-address section of this word, bits 1–8, is used to address the micro-programme store 24 in the control unit 13. The micro-programme store 24 is a pre-programmed store and may conveniently be of the type using diodes. The eight bits forming the M-address are split into two equal sections of four bits for each section. One section of four bits is used to select one out of sixteen micro-programme units while the other section of four bits selects one out of sixteen micro-order units per micro-programme. Each micro-order selection unit provides twelve outputs arranged in a plug and socket translation field having an output register to provide one output in each of twelve groups of eight outputs, thus providing a 12-out-of-96 selection arrangement. The outputs are used to control the indexing and arithmetic units and are effectively micro-instructions.

As mentioned previously the data processing device is organised on a three phase basis and groups GP1 to GP4 are used as phase 1 micro-instructions, groups GP5 to GP9 are used as phase 2 micro-instructions, while groups GP10 to GP12 are used as phase 3 micro-instructions. In a large number of data processing instructions the main instruction, such as a two address ADD instruction, requires more than one basic step. In the case of add for example, the data processing device is called upon to use the functional units (i.e. the indexing unit and the arithmetic unit) to (i) extract the operand information from the store and put it in one of the accumulators, (ii) extract the operator information from store, add it to the operand and pass the result to one of the accumulators. Each basic step must be carried out separately and requires the use of both the index and arithmetic units.

In the data processing device under discussion, each basic step is handled separately thus allowing only one "pass" through each of the functional units at any one time. To enhance the speed of operation of the data processing device, single passes through separate functional units are performed together where possible under the control of a single micro-order. Hence, to perform any main programme order a micro-programme of micro-orders is required each micro-order dealing with one basic step in the execution of that order in each functional unit. Each operation required to execute that basic step for each functional unit is controlled by a micro-instruction, a plurality of micro-instructions being generated for each functional unit and to define the next step of the main or micro-programme for each micro-order. The main programme instruction code (i.e. the order register M-address bits 1–8) is, therefore, the address of the first micro-order in the micro-programme store of a series of micro-orders forming a micro-programme used to control the data processing device, in obeying the basic steps required to carry out the main programme instruction.

The following tables show a typical assignment of micro-instruction significances:

TABLE 1 (PHASE 1)

| | Class | Function | From— | Bits | To— | Bits |
|---|---|---|---|---|---|---|
| Group 1 | 1 | Data Transfers | Mod. Reg. (2)[1] | 1–16 | Index Processer Operand | 1–18 |
| | 2 | | Mod. Reg. (1)[1] | 1–16 | | 1–19 |
| | 3 | | Order Reg | 1–8 | | 1–6 |
| | 4 | | do | 9–24 | | 1–16 |
| | 5 | | do | 29–44 | | 1–16 |
| | 6 | | Sequence Control Reg | 1–16 | | 1–16 |
| | 7 | ±1 | Used with any of Group 2.[2] | | | |
| | 8 | Idle. | | | | |
| Group 2 | 1 | +2 | Used with 4 and 5 of Group 1. | | | |
| | 2 | Data Transfer | Iteration Count (O.R.) | 29–44 | Index Processer Operator | 1–16 |
| | 3 | | Accumulator 3 | 25–40 | | 1–16 |
| | 4 | | A.D.T. Input Address Reg | 1–16 | | 1–16 |
| | 5 | | A.D.T. Output Address Reg | 1–16 | | 1–16 |
| | 6 | | Micro-Jump Address Reg. 1 | 1.8 | I.P. Operand | 1–8 |
| | 7 | ±1 | Used with any of Group 1. | | | |
| Group 3 | 1 | Data Transfer | Index Processer | 1–16 | Mod. Reg. (2) | 1–16 |
| | 2 | Indirect Address. | | | | |
| | 3 | Data Transfer | Index Processer | 1–16 | Order Reg | 9–24 |
| | 4 | | do | 1–16 | do | 29–44 |
| | 5 | | do | 1–16 | A.D.T. Input Address Reg | 1–16 |
| | 6 | | do | 1–16 | A.D.T. Output Address Reg | 1–16 |
| | 7 | Subtract | Used with any of Group 4. 1/7 or 2/7. | | | |
| | 8 | Idle. | | | | |
| Group 4 | 1 | Store Read | Used in Conjunction with a Transfer from Index Processer Output to the Store. | | | |
| | 2 | Store Read/Rewrite | | | | |
| | 3 | | Index Processer | 1–8 | Order Reg | 1–8 |
| | 4 | | do | 1–8 | Micro-Jump Address Reg. 1 | 1–8 |
| | 5 | | do | 1–16 | Sequence Control Reg | 1–16 |
| | 6 | | do | 1–16 | Accumulator 3 | 25–40 |
| | 7 | Subtract | Used with any of Group 3. 1/7 or 2/7. | | | |
| | 8 | Idle. | | | | |

[1] Modifier Reg. (2) refers to the modifier register specified by modified tags, bits 46 to 48, in the O.R. Modifier Reg. (1) refers to the modifier register specified by the modifier tags, bits 26–28, in the O.R.

[2] 1/7 with 3/6 gives ±1 facility, 1/7 with 3/1–3/5 gives only +1 facility.

TABLE 2 (PHASE 2)

| | Class | Function | From— | Bits | To— | Bits |
|---|---|---|---|---|---|---|
| Group 5 when 10/7 is Excluded from Order. | 1 | Data Transfer | Accumulator 1 | 1–48 | Arith. Proc. Operand | 1–48 |
| | 2 | do | Accumulator 2 | 1–48 | do | 1–48 |
| | 3 | do | Accumulator 3 | 1–48 | do | 1–48 |
| | 4 | do | Random Highway | [1] 1–48 | do | 1–48 |
| | 5 | do | A.D.T. | [1] 1–48 | | 1–48 |
| | 6 | do | Peripheral Equip | [1] 1–24 | | 1–24 or 25–48 |
| | 7 | do | Sequence Control Reg | 1–16 | A.P. Operand | 9–24 & 29–44 |
| | 8 | Idle. | | | | |
| Group 5 when 10/7 is Included in Order. | 1 | Multiplication. | | | | |
| | 2 | Division and Size Comparison. | | | | |
| | 3 | Square Root. | | | | |
| | 4 | Floating Point. | | | | |
| | 5 | Standardisation. | | | | |
| | 6 | Tape Assembly. | | | | |
| | 7 | Random Highway Idle. | | | | |
| | 8 | Idle. | | | | |
| Group 6 | 1 | Data Transfer | Accumulator 1 | 1–48 | Arith. Proc. Operator | 1–48 |
| | 2 | | Accumulator 2 | 1–48 | | 1–48 |
| | 3 | | Accumulator 3 | 1–48 | | 1–48 |
| | 4 | | Any Store | 1–24 or 1–48 | | 25–48 or 1–48 |
| | 5 | 1 Bit Rotation in Accumulator 3. | | | | |
| | 6 | Sub-Section Selection. | | | | |
| | 7 | Add 1 to Arithmetic Processer. | | | | |
| | 8 | Idle. | | | | |
| Group 7 | 1 | Data Transfer | Arithmetic Processer | 1–48 | Accumulator 3 x 1 | 1–48 |
| | 2 | | do | 1–48 | Accumulator 1 x 24 | 1–48 |
| | 3 | | Accumulator 3 | 1–24 | Accumulator 3 x 2 | 25–48 |
| | 4 | Direct (1 Bit) Right Shift | | | Accumulators 3DRS | 1–48 |
| | 5 | Direct (1 Bit) Left Shift | | | Accumulators 3DLS | 1–48 |
| | 6 | Store Write | Arithmetic Processer | 1–48 | Stores | 1–48 |
| | 7 | Data Transfer | do | [2] 1–20 | Order Register | 9–28 or 29–48 |
| | 8 | | | | | |
| Group 8 when 5/6 is Excluded from Order. | 1 | Add and +1 [3] | Add if None of These. | | | |
| | 2 | Subtract and −1 [4] | | | | |
| | 3 | Subtract | | | | |
| | 4 | 48 Bit Operation. | | | | |
| | 5 | High Priority—Interrupt Inhibit Reset. | | | | |
| | 6 | Merge [1] 1's. | | | | |
| | 7 | Merge [1] 0's. | | | | |
| | 8 | Idle. | | | | |

TABLE 2—Continued

| | Class | Function | From— | Bits | To— | Bits |
|---|---|---|---|---|---|---|
| Group 8 when 5/6 is Included in Order. | 1 | Outgoing Address | Peripheral Devices Operations | 1-8 | A.P. Operand | 1-8 |
| | 2 | Incoming Address | Peripheral Devices Operations | 1-8 | do | 1-8 |
| | 3 | Outgoing Ready Bit | Peripheral Devices Operations | 1-8 | do | 1-8 |
| | 4 | Incoming Ready Bit | Peripheral Devices Operations | 1-8 | do | 1-8 |
| | 5 | Address Reset. | | | | |
| | 6 | High Priority—Interrupt Inhibit Set. | | | | |
| | 7 | Spare Microbit. | | | | |
| | 8 | | | | | |
| Group 9 | 1 | Data Transfer | Arithmetic Proc | 1-48 | Accumulator 1 x 1 | 1-48 |
| | 2 | Data Transfer | do | 1-48 | Accumulator 1 x ½ | 1-48 |
| | 3 | Data Transfer | do | 1-48 | Accumulator 1 x 2 | 1-48 |
| | 4 | Data Transfer | do | 1-48 | Accumulator 2 x 1 | 1-48 |
| | 5 | Data Transfer | do | 1-48 | Accumulator 2 x ½ | 1-48 |
| | 6 | Data Transfer | do | 1-48 | Accumulator 2 x 2 | 1-48 |
| | 7 | Any Output | See Group 5, 5/4, 5/5, 5/6. | | | |
| | 8 | Idle. | | | | |

[1] The direction of these data transfers is specified by micro-instruction 9/7. If 9/7 is included in the micro-order then the transfer referred to is an output transfer. If 9/7 is excluded then an input transfer is inferred.

[2] Upon micro-instruction 1/4 and 1/5 depends whether the contents of the arithmetic processer goes to the O.R. bit positions 9-28 or 29-48.

[3] A.P. performs addition, adding one to the sum.

[4] A.P. performs subtraction, subtracting one from the difference.

TABLE 3 (PHASE 3)

| | Class | Function | | |
|---|---|---|---|---|
| Group 10 | 1 | Load Data Channeller Select Register (Peripheral Equipment). | | |
| | 2 | Accumulator 2 x 22 to Accumulator 1. | | |
| | 3 | Bit 25 in Arith. Proc. | 1 | (Specifies Condition) |
| | 4 | Bit 45 in Arith. Proc. | 1 | (Specifies Condition) |
| | 5 | 48 Bit Operation Specified. | | |
| | 6 | Bit 24 of Arithmetic Processer. | | |
| | 6 | Bit 24 of Arithmetic Processer. | | (Specifies Condition) |
| | 7 | Select Arithmetic. | | |
| | 8 | Idle. | | |
| Group 11 | 1 | GPJ Indicator Set.* | | (Specifies Condition) |
| | 2 | Bit 58 of Arithmetic Processer. | =1 | (Specifies Condition) |
| | 3 | Contents of Arithmetic Processer. | =0 | (Specifies Condition) |
| | 4 | Contents of Index Processer. | =0 | (Specifies Condition) |
| | 5 | Index Processer Bit 16. | =1 | (Specifies Condition) |
| | 6 | Arithmetic Processer Bit 1=0. | | (Specifies Condition) |
| | 7 | Overflow and Size Comparison. | | (Specifies Condition) |
| | 8 | Idle. | | |
| | | If Condition is Fulfilled | If Condition is Unfulfilled | If No Condition is Specified |
| Group 12 | 1 | Main Jump to O.R. 9-24 | Main Jump to O.R. 29-44 | Select Next Main Order. |
| | 2 | Jump to MJAR1 | Step On | Step On. |
| | 3 | Repeat Microorder | do | Optional Stop and Step On. |
| | 4 | do | S.N.M.O | Repeat Micro-Order. |
| | 5 | Jump to O.R. 9-24 | Step On | Fault. |
| | 6 | Step On | S.N.M.O. | |
| | 7 | Jump to MJAR2 | Jump to MJAR1. | |
| | 8 | S.N.M.O | Step On. | |

*General Purpose Jump Indicator Set is a conditioned statement. The G.P.J. specifies the condition existing in part of the logic of phase 3. If this logic is set then condition 11/1 is fulfilled, if this logic is not set then condition 11/1 is unfulfilled.

The actual operation of the data processing device will be more readily understood from the following description which describes the indirect addressing facilities in accordance with the invention.

As mentioned above, the order register includes two bit positions or tags reserved for indirect addressing operations. If either or both of these tags are marked with a "1" then the indirect addressing operation is initiated. The order register contains two store address portions which denote, in the absence of indirect address markings, the address of the required data in the store. However, for indirect addressing operations one of the indirect address tag positions refers to the first store address portion while the other tag refers to the second store address portion in the order register. Indirect addressing operations are such that when indirect markings are included in the order word the associated store address in the order word must be replaced with an address stored in the main store. FIG. 3 shows the constitution of the order word which will be placed in the order register.

If bit 25 of the order register is marked, then bits 9–24, the first store address, specify the address in the store of a further address while if bit 45 of the order register is marked, then bits 29–44, the second address, specify the address in the store of a further address.

The two indirect address marking tags are fed to the indirect address control logic 28 in FIG. 1 and are shown as OR25 and OR45 in the logical diagram of this logic in FIG. 2. The logic shown in FIG. 2 assumes the use of NAND gate elements which are arranged to produce a "0" state output when all inputs to the gate are in the "1" state and a "1" state output when any or more of the inputs are in the "0" state. The other elements shown in FIG. 2 are toggles TIA1 and TIA2 and a delay line DI–A. The toggles are arranged to produce a "1" state output from their "1" side and a "0" state output from their "0" side when set and a "1" state output from their "0" side and a '0" state output from their "1" side when reset. A "1" state input pulse to the toggle on the appropriate side causes the change of state of the toggle. The delay line element is arranged to produce a pulse of defined length when fed with a "0" to "1" state-going edge.

The actual signals from the order register bits 25 and 45 fed to the indirect-address control logic 28 shown in FIG. 2 are normal in the "1" state and are switched to the "0" state when an indirect address marking is written in to the relevant order word tag. The order register consists of forty-eight toggles and these toggles are conditioned by the order word, thus the signals fed to the indirect-address control logic are taken from the reset or "0" side of the order register toggles for bits 25 and 45. Gate GI1, therefore, will produce a "1" state output whenever a new order word is written into the order register which includes at least one tag containing indirect address marking.

The 25th and 45th bits of the store output are also fed in inverse logic form to the indirect address control logic. These paths are not shown in FIG. 1, for simplicity of that figure, however, they appear as signals STB25 and STB45 in FIG. 2. Hence whenever the next main programme order word, read from the store, contains indirect address markings a "1" state output will be produced from gate GI2. At this stage toggle TIA1 will be reset causing a "1" state output from gate GI5. Toggle TIA2 will be set at this stage as this toggle is set each time signal SNMO is generated. Signal SNMO is generated in the phase 2 control logic 27 whenever it is required to select the next main order of a programme and the generation of this signal causes the addressing of the store with the address in the programme sequence control register 17 (in FIG. 1) to cause the read-out of the next order word from the programme section of the store. As the information read from the store after the generation of signal SNMO will always be programme order word information, the use of toggle TIA2 prevents indirect address mark "mimicking" by normal working data as the set output of this toggle controls gate GISP1. This gate GISP1, also fed by gated GI2 and GI5, produces a "0" state output on lead IP3 which is used as an inhibit signal, in the phase 3 logic, to inhibit the generation of a "start phase 1" signal P1S transmitted to the phase 1 control logic 25 in FIG. 1, and to inhibit the generation of the micro-address strobe signal M–AS which causes the addressing of the micro-programme store M–PS by the M-address in order register bits 1–8 via the micro-address gating circuit M–AG.

The generation of signal SNMO, however, causes the reading-out of the next programme order word from the store and the transfer of this order word into the order register 14. The toggles in this register are, therefore, conditioned in accordance with the next programme order word data.

The "1" state output from gate GI1 is inhibited by a "0" state output from gate GII until a "0" state signal appears on lead EP3. This condition will be experienced when the phase 3 operations for the last micro-order of the previous main programme order have been completed.

The removal of the inhibit by the switching of gate GII allows a "0" state pulse, of duration defined by delay line DI–A, to be produced at the output of gate GI3, as toggle TIA1, will be reset at this stage. The "0" state pulse is used to generate two signals M–A/MJR and W–IAC. Signal M–A/MJR controls the transfer of the current M-address from the micro-address section (bits 1–8) of the order register 14 into the micro-jump register 22. This signal and the paths between the order register OR bits 1–8 and the micro-jump register 22 can be seen in FIG. 1. Signal W–IAC controls the transfer of a wired-in address from the address generator 16 shown in FIG. 1. This address generator is also controlled by the conditions of order register bits 25 and 45 and will be discussed later.

The "0" state pulse output from gate G13, after inversion by gate GI4 is used to set toggle TIA1 via its input AND gate GIA1. This operation is performed before the start of phase 1 as toggle TP1 (not shown) is the phase 1 control toggle in the phase 1 control logic 25 (FIG. 1) of the control unit 13. This toggle is set by signal P1S and, as shown above, this signal has been inhibited by signal IP3 from the indirect address control logic. Gate GIA1 is fed from the reset side of toggle TP1, lead TP1(*b*), and therefore this input AND gate will be inhibited at the start of phase 1. The setting of toggle TIA1 causes the inhibiting of gate GI3 and, via inverter GI5, causes the removal of the phase 3 logic inhibit on lead IP3 by closing gate GISP1. This allows the phase 3 control logic P3L to generate signals M–AS and P1S which cause the addressing of the micro-programme store 24 with the micro-address in order register bits 1–8 and the starting of phase 1 by setting of toggle TP1 (not shown) in the phase one control logic 25 respectively.

The actual micro-address used to address the micro-programme store when signal M–AS is produced is defined by the address generator 16 and consideration will now be given to this generator. The address generator may conveniently consist of sixteen AND gates having two inputs each. A pair of gates is used to control each toggle in the order register M-address section, when signal W–IAC is produced. One of the inputs to each AND gate will be signal W–IAC while the other input is either a permanent or a switchable bias condition. The switchable bias conditions are controlled by gating activated by the conditions of the order register indirect address marking tags and these bits dictate the value of the three least significant bits of the wired-in micro-address. If order register bit 25 is a "1," then the wired-in M-address ends in 010 and, if order register bit 25 is a "0" and bit 45 is a "1" the wired-in M-address ends in 100. For ease of description it will be assumed that the full micro-addresses are 10100010 and 10100100 giving equivalent octal values of 242 and 244.

The indirect address handling micro-routine in the micro-programme store consists of four micro-orders which are assigned M-address 242 to 245, entry into the routine being either at M-address 242 or 244 according to the indirect address marking conditions. Three separate address marking conditions can be experienced, i.e. (i) $OR25=1$; $OR45=0$; (ii) $OR25=OR45=1$ and (iii) $OR25=0$; $OR45=1$. Conditions (i) and (ii) cause entry at M-address 242 while condition (iii) causes entry at M-address 244.

Condition (i) $OR25=1$; $OR45=0$

The generation of signal W–IM–A will cause wired-in M-address 242 to be written into order register bits 1–8 and the generation of signal M–AS will cause this M-address to address the micro-programme store 24.

M-address 242 will cause the following micro-instructions forming the required micro-order to be read from the micro-programme store M–PS.

| Phase: | |
|---|---|
| 1 | 4882 |
| 2 | 84788 |
| 3 | 383 |

The actual significances of the micro-instructions selected will be seen with reference to the micro-instruction tables above.

Phase 1

The selected micro-instructions in this phase control the transfer of the contents of order register bits 9–24 (the indirect first store address) to the index processer 20, via the index processer operand switch 18 (micro-instruction 1/4), and the addressing of the store 12 with the output of the index processer 20 via the index processer output switch 21, for a store read/re-write operation (micro-instruction 4/2). It should be noted that the first store address is passed through the index processer by adding zero to that address.

Phase 2

The selected micro-instruction in this phase controls the transfer of the store output to the arithmetic processer, by way of the operand switch 29 (micro-instruction 6/4), and the transfer of the resultant of a store output-plus zero operation, to order register bits 9–24 (micro-instruction 7/7) via the arithmetic processer output switch 32. The indirect first store address in the order word is, therefore, replaced with the contents of the store location defined by that indirect address.

Phase 3

The selected micro-instructions in this phase cause a test to be made on bit 25 of the output of the arithmetic processer (specified by micro-instruction 10/3) and, if this bit is a "1," a repeat micro-order operation is performed controlled by micro-instruction 12/3, the jump condition being fulfilled. This arrangement allows for the store address specified by the indirect address in the order register to be, itself, an indirect address. If bit 25 of the output of the arithmetic processer is a "0" indicating that the new address is a real address not an indirect address, a step on to next micro-order operation is performed by the phase 3 control logic under the control of unfulfilled jump condition micro-instruction 12/3. Thus one is added to the contents of the order register bits 1–8 by circulation of the current M-address through the index processer.

M-address 243 (second micro-order of indirect addressing routine)

The addressing of the micro-programme store with the binary equivalent of actual number 243 will cause the following micro-order to be read from the micro-programme store.

| Phase: | |
|---|---|
| 1 | 8828 |
| 2 | 88888 |
| 3 | 812 |

Phase 1

The selection of micro-instruction 3/2 is used, in the indirect address control logic 28 in FIG. 2, to open gate GI6 if order register bit 45 is a "0." When gate GI6 is opened a signal JP3 is generated which is used to set a general purpose jump control toggle (not shown) in the phase 3 control logic 27. The general purpose logic toggle is referred to in the phase 3 table of micro-instructions as the general purpose jump indicator GPJI. As consideration is being given to condition (i) of the three possible conditions stated above the general purpose jump indicator will be set.

Phase 2

Idle.

Phase 3

Micro-instruction 11/1, selected in this phase, specifies a test for the condition of the general purpose jump indicator and, if set, will cause a jump to the micro-order specified by the micro-address held in the micro-jump register 22 under the control of micro-instruction 12/2. The micro-address held in the micro-jump register 22 is in fact the M-address of the micro-order for the current main programme order and is now returned to M-address bits 1–8 of the order register. Thus this operation returns the data processing device to the main programme having replaced the original indirect first store address in the order word with the required real address.

Condition (ii) $OR25=OR45=1$

If the general purpose jump indicator is not set, the unfulfilled jump condition and micro-instruction 12/2 will cause a step-on operation to be performed by the phase 3 control logic. This will only be performed if order register bit 45 is a "1."

M-address 244 (third micro-order of indirect addressing routine)

M-address 244 will cause the following micro-instructions forming the required micro-order to be read from the micro-programme store 24.

| Phase: | |
|---|---|
| 1 | 5882 |
| 2 | 84788 |
| 3 | 483 |

Phase 1

The selected micro-instructions in this phase control the transfer of the contents of order register bits 29–44, the indirect second store address, to the index processer 20, via the index processer operand switch 18 (micro-instruction 1/5), and the addressing of the store 12 with the output of the index processer 20, under the control of the index processer output switch 21, for a store read/re-write operation (micro-instruction 4/2).

Phase 2

The selected micro-instructions in this phase control the transfer of the store output to the arithmetic processer 31, by way of the operand switch 29 (micro-instruction 6/4) and the transfer of the resultant, of a store-plus-zero operation, to order register bits 29–44 (micro-instruction 7/7), via the arithmetic processer output switch 32. The indirect second store address in the order word is, therefore, replaced with the contents of the store location specified by the order word indirect address.

Phase 3

The selected micro-instructions in this phase cause a test to be made on bit 45 of the output of the arithmetic processer (specified by micro-instruction 10/4) and, if this bit is a "1," a repeat micro-order operation is performed controlled by micro-instruction 12/3. This arrangement allows for the store location specified by the indirect address in the order register to be an indirect address. If bit 45 of the output of the arithmetic processer is a "0," a step on to next micro-order operation is performed by adding 1 to the M-address.

M-address 245 (fourth micro-order of indirect addressing routine)

M-address 245 will cause the following micro-instructions forming the required micro-order to be read from the micro-programme store M–PS.

| Phase: | |
|---|---|
| 1 | 8787 |
| 2 | 88888 |
| 3 | 842 |

Phase 1

The selection of micro-instructions 2/7 and 4/7 causes a zero-minus-one operation to be performed in the index processer 20, making the output of that processer equal to minus one.

Phase 2

Idle.

Phase 3

The selected micro-instructions in this phase cause a test to be made for zero on the output of the index processer and if, as will be the case, this output is not equal to zero, a jump to the M-address held in the micro-jump register 22 is performed. This operation returns the data processer to the main programme from the indirect addressing routine.

Condition (iii) $OR25=0$; $OR45=1$

When this condition occurs the indirect addressing routine is entered at M-address 244 as the wired-in address generator 16 is conditioned by the states of the indirect address tags. The routine is as shown above for M-addresses 244 and 245.

Finally it will be noticed that the two points of exit from the indirect address routine are by micro-jumps to the M-address held in the micro-jump register 22. This condition (i.e. the satisfied micro-jump condition at the end of micro-order 243 and 245) is used to reset toggle TIA1 in the indirect address control logic. Toggle TIA2 will be reset towards at the end of phase 3 of the first micro-order of the routine.

We claim:

1. A stored programme data processing device including a control unit, a main store, an order register for storing an order word appropriate to a main programme order, said order word being formed of an instruction-defining code and at least one address code, a first functional unit controlled by said control unit to address said main store, a second functional unit controlled by said control unit to perform arithmetic operations, a pre-programmed micro-programme store in said control unit, means effective at the start of any main programme order for addressing said micro-programme store with said instruction-defining code in said order register, means in said micro-programme store responsive to the addressing of the store by said instruction-defining code for generating control signals for the instruction specified, said instruction code forming the first of a series of sequential codes which define a micro-programme of micro-orders to be used to extract control information for the micro-programme store for use in said control unit for the control of the data processing device in the execution of said instruction, means for detecting a marking in a particular element of the order register directly associated with said address code, said marking being indicative of an indirect address and for transferring the instruction code from the order register to a subsidiary register and for replacing said instruction code by a particular instruction code relative to indirect address operation and defining a micro-programme which enables the micro-programme store (a) to control the first functional unit to address the main store with the store address in the order register and (b) to control the second functional unit to replace the store address in the order register by the address read from the store location specified by that address and means in said second functional unit for testing whether the address read from said store location includes a marking indicative of an indirect address and if it does the indirect address operation is repeated until the test determines that the address read from the main store is not an indirect address, whereupon the original instrucion code is transferred from said subsidiary register back to the order register thereby re-entering the main programme order.

2. A stored programme data processing device as claimed in claim 1, wherein the order word stored in the order register includes two store addresses either or both of which may be used as indirect addresses and means are provided for generating different instruction codes according to whether one or the other or both of the associated markings indicate that the store addresses are to be used as indirect addresses whereby the indirect address operation is effected for one or the other of the two store addresses or for both successively.

3. A stored programme data processing device as claimed in claim 1, wherein an address generator having wired-in instruction codes is provided for obtaining the instruction code for the indirect address operation.

4. A stored programme data processing device as claimed in claim 3, wherein the address generator is conditioned to generate instruction codes under the control of the detecting means, the instruction code generated being determined by indirect address indication obtained from the order register.

References Cited

UNITED STATES PATENTS

| | | | |
|---|---|---|---|
| 3,323,108 | 5/1967 | Mullery et al. | 340—172.5 |
| 3,317,899 | 5/1967 | Chien et al. | 340—172.5 |
| 3,311,887 | 3/1967 | Muroga | 340—172.5 |
| 3,303,477 | 2/1967 | Voigt | 340—172.5 |
| 3,249,920 | 5/1966 | Pulver | 340—172.5 |
| 3,222,649 | 12/1965 | King et al. | 340—172.5 |
| 3,201,761 | 8/1965 | Schmitt et al. | 340—172.5 |
| 3,153,225 | 10/1964 | Merner et al. | 340—172.5 |
| 3,111,648 | 11/1963 | Marsh et al. | 340—172.5 |
| 3,036,773 | 5/1962 | Brown | 235—157 |

GARETH D. SHAW, *Primary Examiner.*